United States Patent [19]

Sabo et al.

[11] Patent Number: 5,163,712
[45] Date of Patent: Nov. 17, 1992

[54] ROTATABLE VACUUM FLANGE

[75] Inventors: David R. Sabo, Nashua, N.H.; Steven P. Young, Billerica, Mass.

[73] Assignee: Varian Associates, Inc., Palo Alto, Calif.

[21] Appl. No.: 783,309

[22] Filed: Oct. 28, 1991

[51] Int. Cl.$^5$ .............................................. F16L 23/00
[52] U.S. Cl. ......................................... 285/7; 285/276; 285/321; 285/414; 285/24; 285/413
[58] Field of Search .................... 285/276, 321, 368, 7, 285/318, 412, 413, 414, 368, 400, 305, 24, 98, 280

[56] References Cited

U.S. PATENT DOCUMENTS

| | | | |
|---|---|---|---|
| 2,058,062 | 5/1936 | Cowles | 285/276 |
| 2,468,315 | 2/1946 | Wagner | 285/276 X |
| 2,757,023 | 7/1956 | Hein | 285/24 X |
| 3,453,010 | 7/1969 | Gerretz | 285/368 |
| 3,455,583 | 7/1969 | Ray | 285/414 X |
| 3,712,648 | 1/1973 | Clifford | 285/321 |
| 3,871,691 | 3/1975 | Takagi et al. | 285/321 |
| 3,966,234 | 6/1976 | Sundholm | 285/368 X |
| 4,653,780 | 3/1987 | Lalikos | 285/276 |

Primary Examiner—Randolph A. Reese
Assistant Examiner—Timothy Aberle

[57] ABSTRACT

A rotatable vacuum flange includes a flange ring having a recess, an insert mounted in the recess in the flange ring, the insert including a seal portion and being adapted for vacuum-tight attachment to a vacuum conduit, and a wire spring positioned between the flange ring and the insert. The wire spring retains the insert in the recess in the flange ring and permits rotation of the insert relative to the flange ring. The flange ring and the insert include grooves located in opposing alignment to receive the wire spring.

4 Claims, 1 Drawing Sheet

ROTATABLE VACUUM FLANGE

FIELD OF THE INVENTION

This invention relates to vacuum flanges used for interconnecting components in a vacuum system and, more particularly, to rotatable vacuum flanges wherein a rotatable insert is retained within a flange ring by a wire spring.

FIELD OF THE INVENTION

Vacuum flanges are widely used in vacuum systems to interconnect system components such as vacuum conduits, or pipes, vacuum valves, vacuum pumps, and the like. The vacuum flange includes means for mechanically interconnecting the components and means for creating a vacuum seal between the interconnected components. The seal is typically created by a metal or elastomer gasket that is mechanically compressed between the components.

In order to facilitate assembly of misaligned vacuum system components, rotatable vacuum flanges have been utilized. The rotatable vacuum flanges include a flange ring with mounting holes and an insert rigidly attached to a vacuum conduit or pipe. The insert mounts in a recess in the flange ring. The flange ring can be rotated relative to the insert to facilitate alignment of mounting holes.

Prior art rotatable vacuum flanges have had certain disadvantages. The insert and the flange ring were separate parts and could easily fall apart during installation. In particular, during assembly of the vacuum flange it was necessary to hold the flange ring and the insert together while installing mounting bolts. This was particularly difficult in the case of large vacuum flanges. The installation difficulties sometimes resulted in damage to the knife-edge seal on the insert and required replacement of the insert.

It is the general object of the present invention to provide improved rotatable vacuum flanges.

It is another object of the present invention to provide rotatable vacuum flanges which are easy to install.

It is yet another object of the present invention to provide rotatable vacuum flanges wherein an insert is retained within a flange ring and is rotatable within the flange ring.

It is a further object of the present invention to provide rotatable vacuum flanges which are easy to manufacture and are low in cost.

SUMMARY OF THE INVENTION

According to the present invention, these and other objects and advantages are achieved in a rotatable vacuum flange comprising a flange ring having a recess, an insert mounted in the recess in the flange ring, the insert including a seal portion and being adapted for vacuum tight attachment to a vacuum conduit, and means for retaining the insert in the flange ring and for permitting rotation of the insert relative to the flange ring.

The means for retaining the insert in the flange ring typically comprises a first circumferential groove in the insert, a second circumferential groove in the flange ring, and a wire spring retained in the first and second grooves. The first and second grooves are located in opposing alignment to receive the wire spring.

In a preferred embodiment, the flange ring includes an inwardly-extending annular rib that defines the recess. The insert includes an outer peripheral surface having the first circumferential groove therein, and the flange ring includes an inner peripheral surface having the second circumferential groove therein. The wire spring typically has a generally circular cross section with a predetermined diameter. The first groove preferably has a depth of about the predetermined diameter or greater for receiving the wire spring during assembly and disassembly of the flange. The second groove preferably has a depth of about one half of the predetermined diameter or less. With this arrangement, the insert is retained within the flange ring by the wire spring during normal use, including installation of the vacuum flange. However, the insert can be removed from the flange ring, for example, when the seal ring is damaged.

BRIEF DESCRIPTION OF THE DRAWINGS

For a better understanding of the present invention, together with other and further objects, advantages and capabilities thereof, reference is made to the accompanying drawings which are incorporated herein by reference and in which.

DETAILED DESCRIPTION OF THE INVENTION

Figure 1:
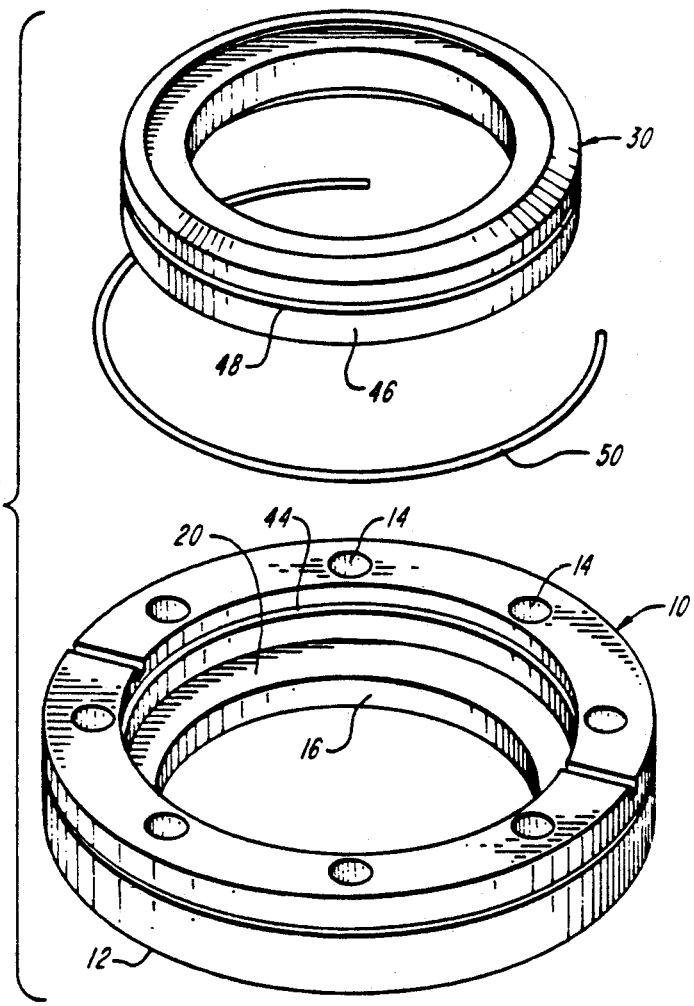
FIG. 1 is an exploded perspective view of a rotatable vacuum flange in accordance with the present invention.
Figure 2:
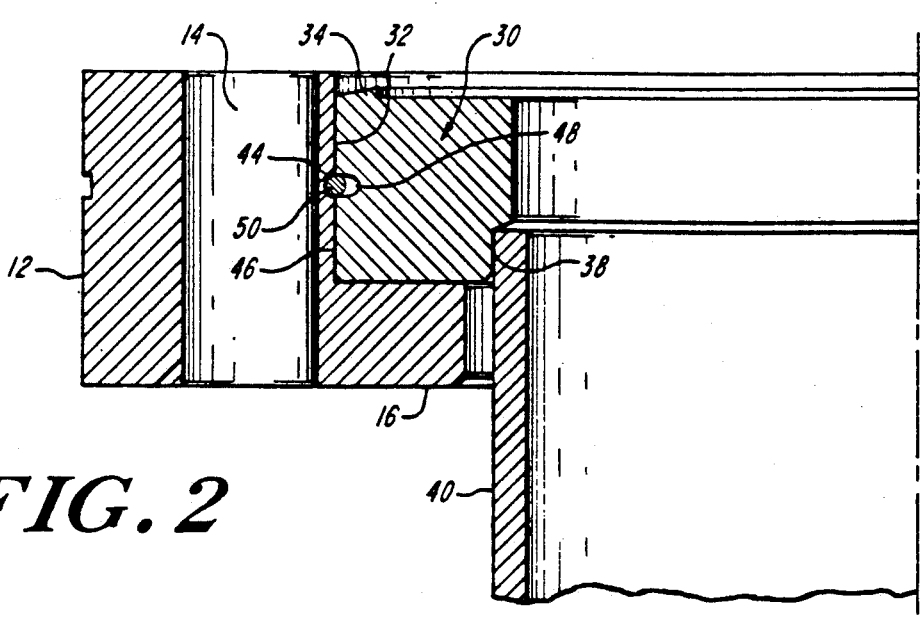
FIG. 2 is a partial cross sectional view of the rotatable vacuum flange attached to a vacuum conduit.

A rotatable vacuum flange in accordance with the present invention is shown in FIGS. 1 and 2. A flange ring 10 has a generally circular shape and is fabricated of a metal such as stainless steel. The flange ring 10 includes an outer portion 12 having mounting holes 14 and an inwardly extending annular rib 16. The rib 16 and the outer portion 12 define an annular recess 20.

A circular insert 30 has a central opening 31 and is fabricated of a metal such as stainless steel. The insert 30 is dimensioned for mounting in the recess 20 in flange ring 10. As best shown in FIG. 2, insert 30 abuts against annular rib 16. The insert 30 is dimensioned with respect to an inner peripheral surface 32 of flange ring 10 to permit rotation of insert 30 relative to flange ring 10. The insert 30 is provided with a circular "knife edge" seal 34 for sealing to a sealing gasket (not shown). The sealing gasket is preferably a metal, such as copper, but can also be an elastomer ring. The insert 30 also includes a circumferential recess 38 for receiving a vacuum conduit or pipe 40. The vacuum conduit 40 is typically sealed to insert 30 by welding.

The rotatable vacuum flange is mechanically attached to another component of a vacuum system by bolts through mounting holes 14 in flange ring 10. A vacuum-tight connection is achieved by pressing knife edge seal 34 against the sealing gasket (not shown). A similar knife-edge seal on the mating component is pressed into the opposite side of the sealing gasket.

In accordance with the present invention, the inner peripheral surface 32 of flange ring 10 is provided with a circumferential groove 44, and an outer peripheral surface 46 of insert 30 is provided with a circumferential groove 48. The grooves 44 and 48 are located on the respective surfaces in opposing alignment to receive a wire spring 50. The wire spring 50 has a generally circular shape when installed and typically has a circular cross section. The wire spring 50 does not necessarily span the entire circumference of grooves 44 and 48.

When the rotatable vacuum flange of the present invention is assembled, as shown in FIG. 2, the wire spring 50 is located partially in groove 44 and partially in groove 48. As a result, the wire spring prevents the insert 30 and flange ring 10 from separating during normal use. However, the insert 30 is free to rotate within flange ring 10. The annular rib 16 is not necessary to retain insert 30 within flange ring 10. However, the annular rib is necessary to press knife edge seal 34 into close contact with the sealing gasket.

As indicated above, the insert 30 is retained within flange ring 10 by wire spring 50. However, the insert 30 can be removed from flange ring 30 by applying an axial pressure to insert 30, thereby causing the wire spring 50 to be forced into groove 48. To permit the removal of insert 30, groove 44 in flange ring 10 preferably has a depth that is about one half of the cross-sectional diameter of wire spring 50 or less. Groove 48 preferably has a depth that is about equal to or greater than the cross sectional diameter of wire spring 50. The groove 48 has sufficient depth to receive wire spring 50 during assembly and disassembly of the vacuum flange. With this configuration, the wire spring 50 can be pressed into groove 48 and the insert 30 can be slidably removed from or installed in recess 20 in flange ring 10. It will be understood that the depths of grooves 44 and 48 may require adjustment to take into account any clearance between flange ring 10 and insert 30.

The disclosed rotatable vacuum flange provides retention of the insert 30 during normal use, while permitting rotation of the flange ring 10 relative to insert 30. Thus, the flange can easily be installed as a single unit. However, the insert 30 can be removed, for example, when the seal 34 is damaged.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A rotatable vacuum flange comprising:
   a flange ring including an inwardly-extending annular rib having a smaller diameter than the remainder of said flange ring, and a plurality of mounting holes for attachment of said flange ring to another flange ring;
   an insert ring mounted within said flange ring, said insert ring including a seal portion and means for vacuum-tight attachment to a vacuum conduit, said insert ring being in direct contact with said annular rib and being axially pressed by said annular rib into contact with a sealing gasket when said flange ring is attached to another flange ring, said insert ring including an outer peripheral surface having a first circumferential groove therein and said flange ring including an inner peripheral surface having a second circumferential groove therein, said first and second grooves being located in opposing alignment when said insert ring is positioned in said flange ring; and
   a wire spring positioned in said first and second circumferential grooves between said flange ring and said insert ring for retaining said insert ring in said flange ring and for permitting rotation of said insert ring relative to said flange ring.

2. A rotatable vacuum flange as defined in claim 1 wherein said wire spring has a generally circular cross section with a predetermined diameter and wherein said first groove has a depth of about said predetermined diameter or greater for receiving said wire spring during assembly and disassembly of said vacuum flange.

3. A rotatable vacuum flange as defined in claim 1 wherein said sire spring has a generally circular cross section with a predetermined diameter and wherein said second groove has a depth of about one-half said predetermined diameter or less.

4. A rotatable vacuum flange as defined in claim 1 wherein the seal portion of said insert ring comprises a circular knife edge for sealing to a gasket.

* * * * *